United States Patent [19]

Sashida

[11] Patent Number: 4,958,186
[45] Date of Patent: Sep. 18, 1990

[54] IMAGE RECORDING APPARATUS

[75] Inventor: Minoru Sashida, Yokohama, Japan

[73] Assignee: Canon Kabushiki Kaisha, Tokyo, Japan

[21] Appl. No.: 190,256

[22] Filed: May 4, 1988

[30] Foreign Application Priority Data

May 12, 1987 [JP] Japan ............................ 62-113468
Jul. 28, 1987 [JP] Japan ............................ 62-186677

[51] Int. Cl.⁵ .............................................. G03B 27/52
[52] U.S. Cl. ...................................... 355/41; 355/45; 355/244
[58] Field of Search ....................... 355/43-45, 355/54, 7, 244; 353/40-42; 358/457, 453

[56] References Cited

U.S. PATENT DOCUMENTS

| | | | |
|---|---|---|---|
| 3,385,161 | 5/1968 | Sage et al. | 355/45 X |
| 4,687,317 | 8/1987 | Appel et al. | 355/7 X |
| 4,757,353 | 7/1988 | Kitai et al. | 355/44 |
| 4,807,041 | 2/1989 | Kishi et al. | 358/457 |
| 4,811,109 | 3/1989 | Shimuzu et al. | 358/453 |

FOREIGN PATENT DOCUMENTS 56-110924 2/1981 Japan .
60-166969 5/1985 Japan .................... 355/244

*Primary Examiner*—L. T. Hix
*Assistant Examiner*—D. Rutledge
*Attorney, Agent, or Firm*—Fitzpatrick, Cella, Harper & Scinto

[57] ABSTRACT

An image recording apparatus which projects an image of an image carrier to a screen and records the projected image to a recording medium comprises projection means for projecting an index on the screen, displacing means for displacing the index along the screen, and control means for controlling an image area to be recorded on the recording medium in accordance with a position of the index on the screen.

9 Claims, 17 Drawing Sheets

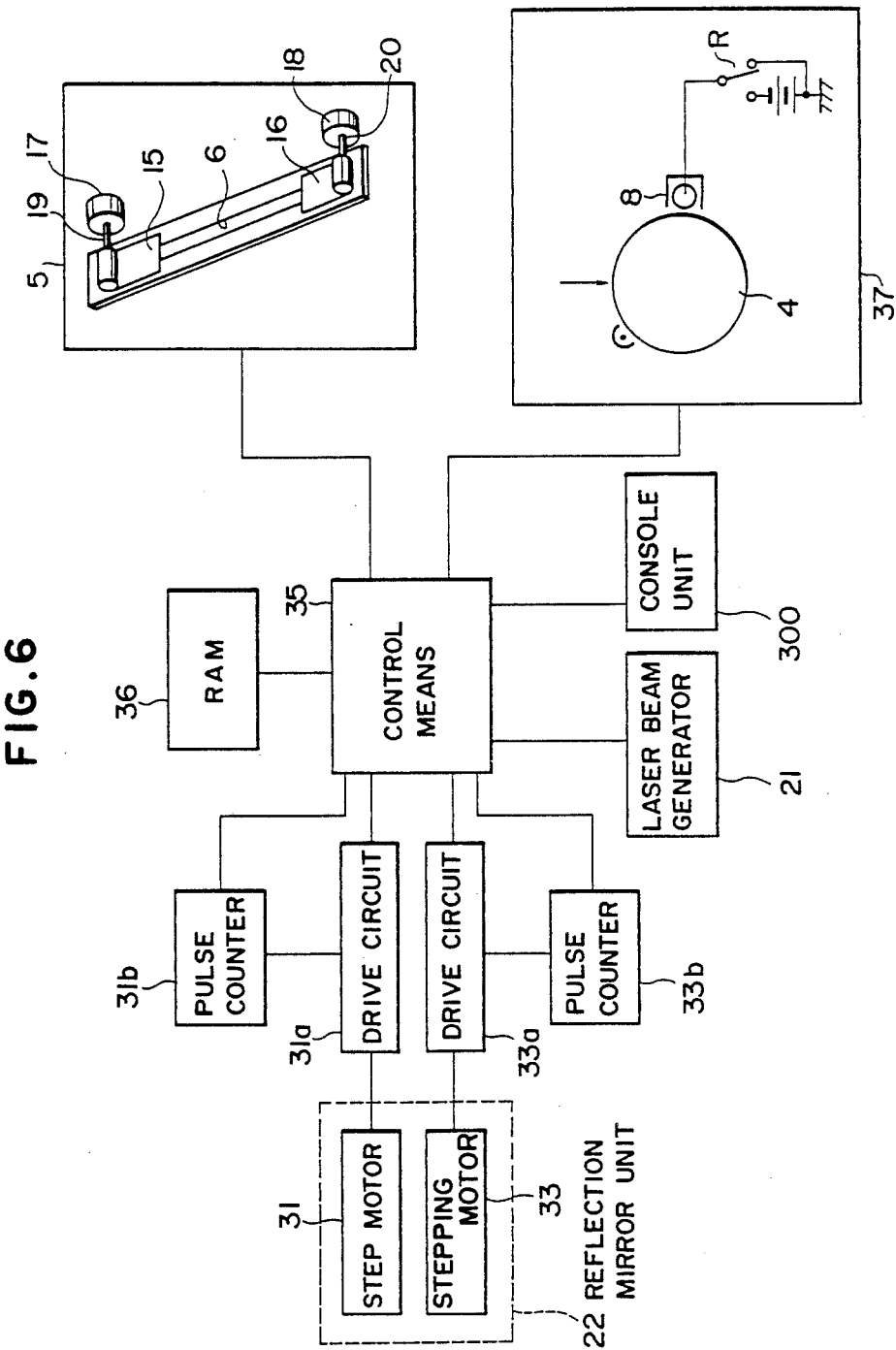

IMAGE RECORDING APPARATUS

BACKGROUND OF THE INVENTION

1. Field of the Invention

The present invention relates to an image recording appparatus which enlarges and projects an image of an image carrier such as a microfilm onto a screen and records the image of the image carrier onto a recording medium.

2. Related Background Art

In a prior art image recording apparatus of this type, a screen 100 an which on enlarged image of an image frame of a microfilm as shown in FIG. 21, and a keyboard 101 such as a ten-key for entering a coordinate or permitting retrieval of the image frame are separately arranged, and the keyboard 101 is manipulated to designate a desired image frame and the image frame is enlarged and projected so that the image is read. When the projected image is to be copied, a predetermined key on the keyboard 101 is manipulated. An apparatus which permits copying of only a desired area of the projected image has been widely used. When an unnecessary area is to be erased or a designated area is to be color printed, the area is designated by the following means. As shown in FIG. 21(a), X and Y coordinate scales S1 and S2 are provided at a bottom and on a left edge of the screen 100, diagonal coordinates P1 (X1, Y1) and P2 (X2, Y2) of a specific area A to be recorded are visually read as shown in FIG. 21(b), and the coordinates are inputted by the keyboard 101 to designate the area as shown in FIG. 21(c). Alternatively, as shown in FIG. 22, two cursors 102 are provided on each of X-axis (horizontal axis) and Y-axis (vertical axis) near outer peripheries of the screen 100, and the cursors 102 are moved to boundaries of a specific area 103 to be recorded.

However, in the former prior art system, the boundary positions of the specific area to be recorded are visually read from the coordinate scales and the keyboard 101 is manipulated to designate the area. Accordingly, it is time consuming and operability is very poor. Further, since the coordinate scales are arranged at the edges of the screen 100 so that they do not intercept the projected image and hence they are spaced from the image area to be designated, the reading of the coordinate scales includes an error which makes it difficult to precisely record the image of the desired area.

In the latter prior art system, the keyboard manipulation is not necessary, but since the cursors 102 are arranged at the edges of the screen 100 so that the cursors 102 do not prevent the observation of the iamge on the screen 100, a distance between the cursor position and the image area to be designated is larger than that of the keyboard input type system. Accordingly, it is difficult to precisely record the desired area of the image.

SUMMARY OF THE INVENTION

It is an object of the present invention to provide an image recording apparatus which enables precise designation of an area of an image to be recorded, by a simple operation.

It is another object of the present invention to provide an image recording apparatus which can display a designated area directly onto a screen.

It is yet another object of the present invention to provide an image recording apparatus which can display a designated area over an image projected on a screen.

The image recording apparatus of the present invention comprises projection means for projecting an index onto a screen, displacement means for displacing a position of the index, and control means for controlling an image area to be recorded on a recording medium in accordance with the position of the index.

BRIEF DESCRIPTION OF THE DRAWINGS

FIG. 6 shows a block diagram of a control system in the embodiment, FIGS. 14(a) and 14(b) show a third embodiment of the present invention, in which FIG. 14(a) illustrates input means and FIG. 14(b) illustrates a screen, FIGS. 15(a) and 15(b) show a fourth embodiment of the present invention in which FIG. 15(a) shows a major portion of display means and FIG. 15(b) illustrates a screen, FIGS. 16(a) and 16(b) show a fifth embodiment of the present invention in which FIG. 16(a) shows a major portion of display means and FIG. 16(b) illustrates a screen, FIGS. 17 and 18 show a sixth embodiment of the present invention in which FIG. 17 shows display means and FIG. 18 shows a schematic construction thereof.

DETAILED DESCRIPTION OF THE PREFERRED EMBODIMENTS

Figure 1:
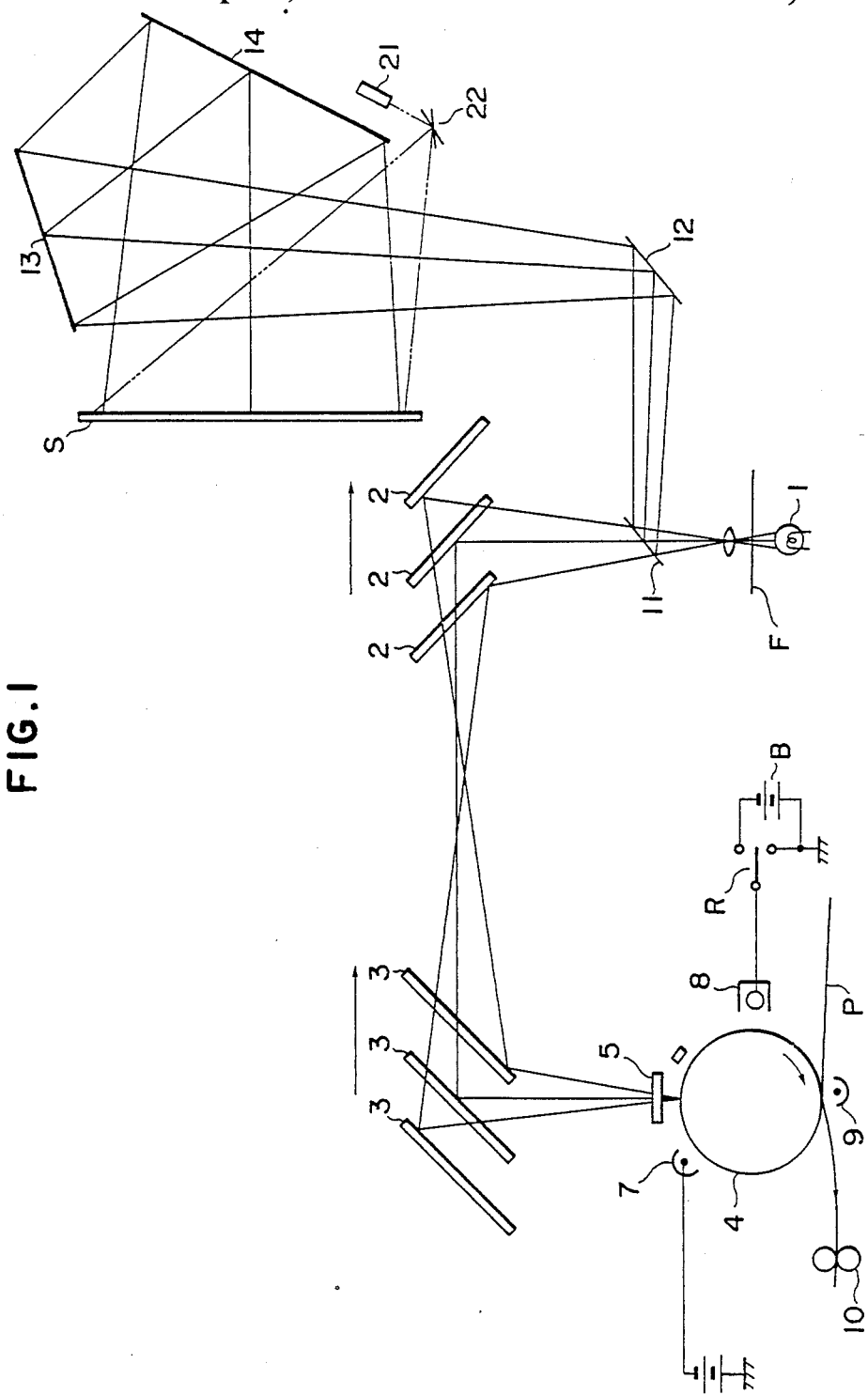
FIG. 1 shows a schematic configuration of a microfilm reader/printer in accordance with one embodiment of the image recording apparatus of the present invention.

FIG. 1 shows a microfilm reader/printer as one embodiment of the image recording apparatus of the present invention. In FIG. 1, F denotes a rolled microfilm as an image carrier, numeral 1 denotes a projection lamp, numerals 2 and 3 denote scanning mirrors arranged to make 90 degrees therebetween, numeral 4 denotes a photosensitive drum, numeral 5 denotes a shutter base mounted above the photosensitive drum 4 and having an axially extending slit 6, numeral 7 denotes a primary charger, numeral 8 denotes a developing unit, numeral 9 denotes a transfer charger, numeral 10 denotes a fixing unit, and numerals 11, 12, 13 and 14 denote mirrors for deflecting a light path to project an image on the microfilm F onto a screen S.

The images on the microfilm F are sequentially scanned and exposed to the photosensitive drum 4 by moving the scanning mirrors 2 and 3 in the directions of arrows so that the images are recorded on a transfer material P according to the well-known electrophotographic process.

Figure 2:
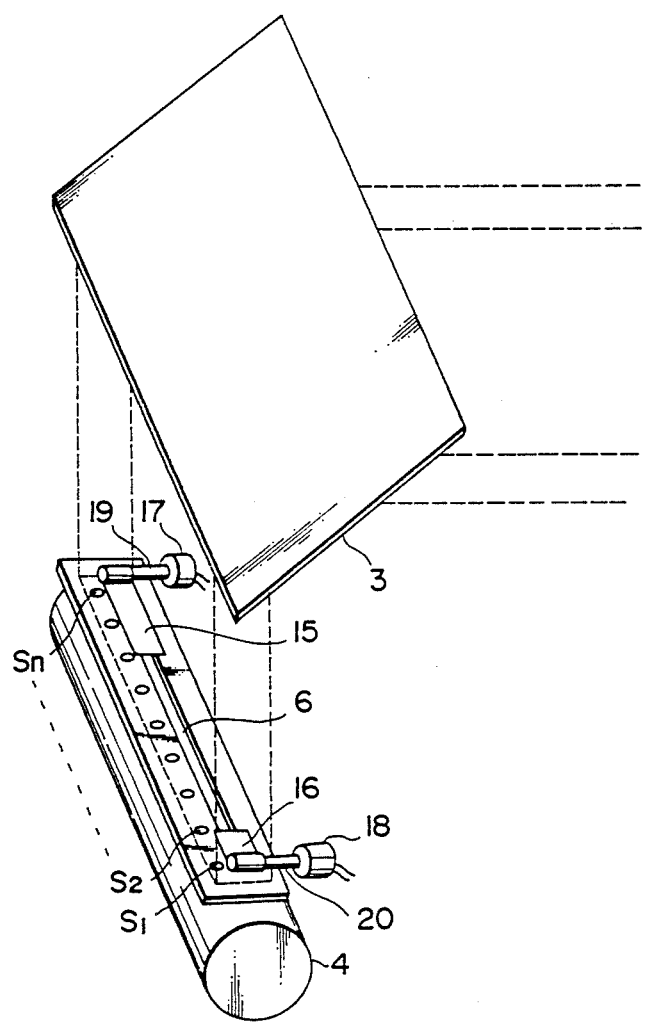
FIG. 2 shows a perspective view of a major portion of a shutter base in the embodiment.

As shown in FIG. 2, the slit 6 is formed in the shutter base 5 axially of the photoconductor drum 4, and a pair of shutter plates 15 and 16 are provided to control an axial exposure area of the photosensitive drum 4 by changing an aperture length of the slit 6. The shutter plates 15 and 16 are made of opaque films and rewindably wound on drive shafts 19 and 20 of pulse motors 17 and 18. They are rewound as the pulse motors 17 and 18 rotate so that the aperture length of the slit 6 is changed at the opposite ends. photo-sensors Sl-Sn made of amorphous silicon are arranged at a predetermined pitch on the shutter base.

A development bias B is applied to the developing unit 8 through a relay R so that the development bias B is turned on and off to control toner development.

In the present embodiment, the following elements are additionally used. Numeral 21 denotes a laser beam generator used as a brilliant point display means for projecting a spot-like light beam onto the screen S to display a brilliant point (index), and numeral 22 denotes a reflection mirror unit used as a brilliant point movement means for reflecting the light beam emitted by the laser beam generator 21 to move the brilliant point to a desired position on the screen S.

Figure 3:
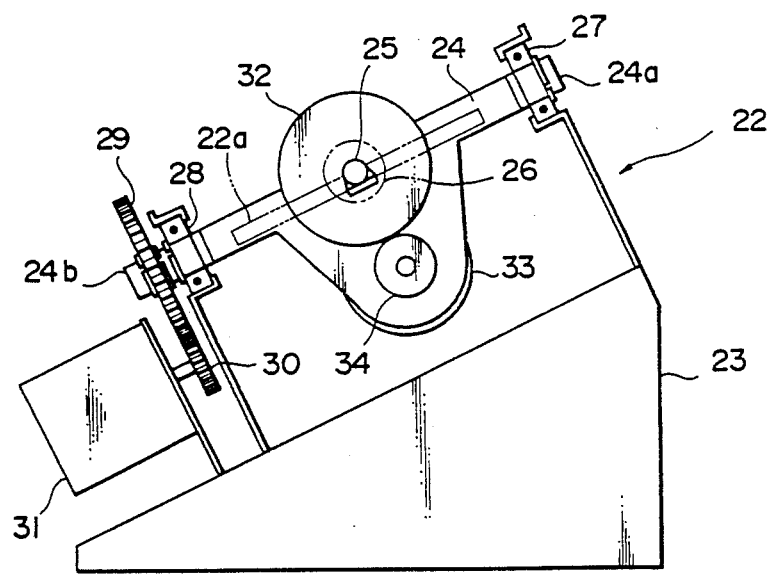
FIG. 3 shows a sectional view of a reflection mirror unit in the embodiment.
Figure 4:
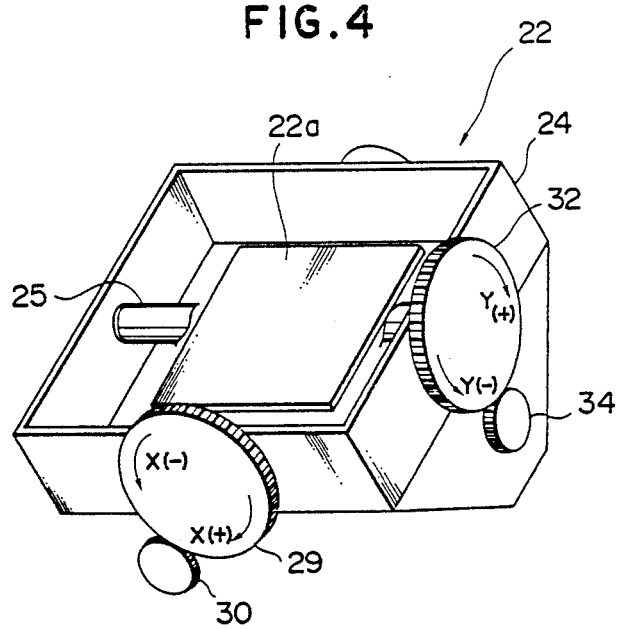
FIG. 4 shows a perspective view of a major portion of the reflection mirror unit in the embodiment.

FIGS. 3 and 4 show sectional and perspective views, respectively, of the reflection mirror unit 22. Numeral 23 denotes a fixed frame, numeral 24 denotes a movable frame, numeral 25 denotes a mirror support shaft for supporting the mirror 22a, numeral 26 denotes a bearing for the mirror support shaft 25, numerals 27 and 28 denote bearings for holding shafts 24a and 24b which are integral with the movable frame 24, numeral 29 denotes a gear fixed to the shaft 24b, and numeral 30 denotes a gear which meshes with the gear 29 and is fixed to a rotation shaft of a stepping motor 31.

When the stepping motor 31 is rotated, the gear 29 is rotated either in an X(−) direction or an X(+) direction of FIG. 4 as the gear 30 rotates. The movable frame 24 coupled to the gear 29 through the shaft 24b is thus rotated so that an angle of inclination of the mirror 22a is changed. The position of the fixed frame 23 of the reflection mirror unit 22 is preset such that the brilliant point displayed on the screen S through the mirror 22a is moved horizontally (X direction) of the screen S.

A gear 32 is fixed to one end of the mirror support shaft 25 which supports the mirror 22a so that a rotational drive force of the stepper motor 33 is transmitted to the gear 32 through the gear 34. Accordingly, as the stepping motor 33 is rotated, the gear 32 fixed to the mirror support shaft 25 can be rotated either in a Y(−) direction or in a Y(+) direction of FIG. 4 so that the angle of inclination of the mirror 22a is changed with the mirror support shaft 25. The position of the fixed frame 23 of the reflection mirror unit 22 is preset such that the brilliant point on the screen S is moved vertically (Y direction) of the screen S when the gear 32 is rotated in either Y(−) direction or Y(+) direction.

Figure 5A:
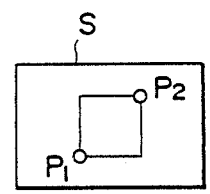
FIG. 5(a) illustrates a brilliant point on a screen and a designated area in the embodiment.
Figure 5B:
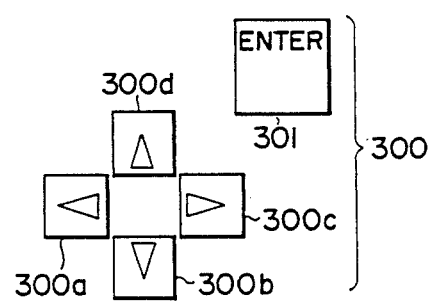
FIG. 5(b) shows a console unit in the embodiment.

FIG. 5(b) shows an embodiment of a console unit 300 for moving the brilliant point on the screen S. By depressing one of move keys 300a, 300b, 300c and 300d to designate the position of the brilliant point, one of the stepping motors 31 and 33 of the reflection mirror unit 22 is rotated to move the brilliant point (index) to a desired position on the screen S as shown in FIG. 5(a). The console unit 300 is manipulated to move the brilliant point to a corner (P1 or P2) of a boundary of an area to be recorded of the image projected onto the screen S, and coordinate data of the position P1 or P2 is entered by an ENTER key 301. In order to detect the position of the brilliant point, drive pulses for drive circuits 31a and 33a which drive the stepping motors 31 and 33 are counted by pulse counters 31b and 33b shown in FIG. 6, and control means 35 determines the displacement of the brilliant point based on the counts to determine the coordinate position of the brilliant point.

FIG. 6 shows a block diagram of a control system in the present embodiment. Numerals 31 and 33 denote stepping motors for changing the angle of inclination of the mirror 22a, numerals 31a and 33a denote drive circuits for the stepping motors 31 and 33, numerals 31b and 33b denote pulse counters for counting the drive pulses to the drive circuits 31a and 33a and numeral 35 denotes control means comprising a microcomputer or the like. Those elements constitute brilliant point detection means. Numeral 36 denotes a RAM for storing a designated coordinate position, numeral 5 denotes a shutter base which controls an image formation area along the axis of the photosensitive drum, and numeral 37 denotes a development bias application circuit for controlling an image formation area along the circumference of the photosensitive drum.

Figure 19:
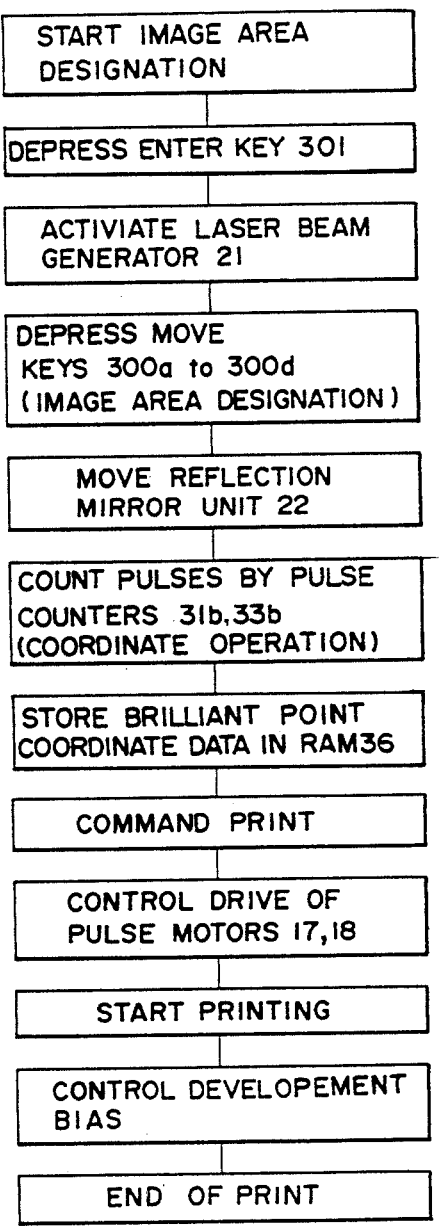
FIG. 19 shows a flowchart of area image designation in the first embodiment.

FIG. 19 shows a flow-chart of image area designation in the first embodiment.

In the present embodiment, the image is processed in the following manner. The ENTER key 301 of the console unit 300 is depressed to activate the laser beam generator 21 to display the brilliant point on the screen S. The position of the brilliant point, that is, the initial position is at the position of the brilliant point in the previous area designation. In order to enter two diagonal coordinate positions P1 and P2 of the designated area, the move keys 300a, 300b, 300c and 300d of the console unit 300 are manipulated to move the brilliant point to the corner P1 of the boundary of the image area to be recorded to designate the area to be recorded. The brilliant point is moved by the reflection mirror unit 22. The displacement of the brilliant point is determined by counting the drive pulses applied to the stepping motors 31 and 33 by the pulse counters 31b and 33b. The control means 35 calculates the displacements in X direction and Y direction from the initial position, and the coordinate data of P1 derived from the calculated result is stored in the RAM 36 by depressing the ENTER key 301. The brilliant point is then moved to the corner P2 of the boundary of the image area to be recorded, which is opposite to the point P1. In this case, the initial position of the brilliant point is the previously entered P1, and the displacement of the brilliant point is calculated based on the counts of the pulse counters 31b and 33b which count the drive pulses applied to the stepping motors 31 and 33, and the coordinate data of P2 derived from the calculated result is stored in the RAM 36.

When the start to print is commanded, the following image formation process is carried out based on the coordinate data stored in the RAM 36. For the direction orthogonal to the axial direction of the photoconductor drum 4, the relay R is actuated or deactuated in accordance with the coordinate data to turn on or off the development bias B applied to the developing unit 8 to control toner development. For the axial direction of the photoconductor drum 4, the pulse motors 17 and 18 shown in FIG. 2 are driven in accordance with the coordinate data to wind or rewind the shutter plates 15 and 16 to control the longitudinal aperture length of the slit 6. The scanning mirrors 2 and 3 are scanned and the relay R is appropriately activated and deactivated to record the image on the transfer material P. As a result, the image of the image frame on the microfilm F is not recorded over the entire area of the image frame but it is recorded on the transfer material P over the area designated by the brilliant point positions P1 and P2 displayed on the screen S.

The area designation is done by displaying the brilliant points on the image displayed on the screen S and moving the brilliant point to the boundary position of the area to be recorded to enter the brilliant position. As a result, the entry of the coordinate position by the keyboard as has been done in the prior art encoder is not necessary and the operability is improved. Further, since the area designation is done by the brilliant point superimposed on the image on the screen S, the area to be recorded and the designated area can be fully matched.

In the present embodiment, the circumferential image record area of the photosensitive drum 4 is defined by turning on and off the development bias, although the entire slit may be opened and closed by a shutter, the primary charger may be turned on and off or the developing unit may be contacted to and moved away from the photosensitive drum. In the present embodiment, the axial image record area of the photosensitive drum 4 is defined by the movement of the shutter plates, although a liquid crystal shutter may be used instead.

In the present embodiment, the laser beam generator is used as the brilliant point display means and the reflection mirror unit is separately provided as the brilliant point move means, although the brilliant point display means and the brilliant point move means may be provided in one unit.

Figure 7:
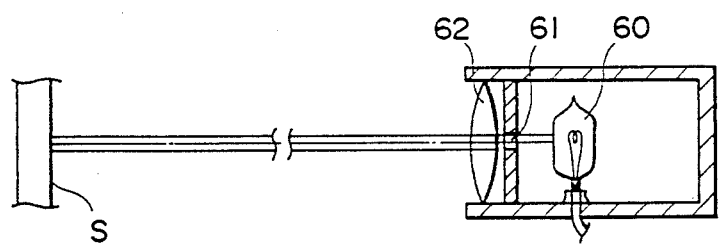
FIG. 7 shows a sectional view of another brilliant point display means.
Figure 8:
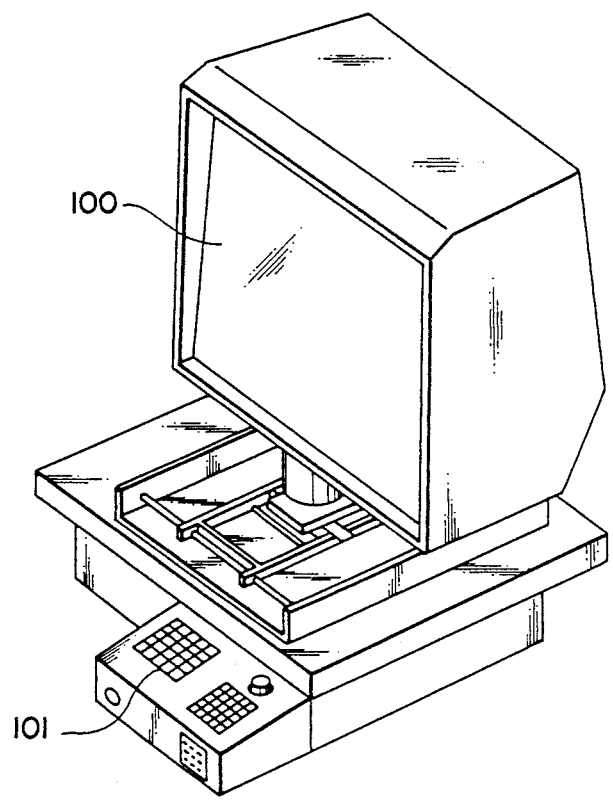
FIG. 8 shows an outer perspective view of one embodiment of a microfilm reader/printer.

In the present embodiment, the laser beam generator is used as the brilliant point display means, although other display means may be used. For example, as shown in FIG. 7, the light beam from the light source lamp 60 is transmitted through a fine hole 61 and a lens 62 to form a light beam by which a brilliant point is displayed.

In the present embodiment, one brilliant point display means is used to display one brilliant point on the screen, and the coordinate data of the brilliant point is sequentially entered. Alternatively, a plurality of brilliant point display means may be provided to display a plurality of brilliant points on the screen, and the brilliant points may be independently moved and the positions thereof may be detected. In this case, the coordinate data of the brilliant points can be entered one time.

In the present embodiment, the image in the designated area is recorded to the transfer material. Alternativley, the area designated by the brilliant points may be erased to record the image. This may be applied to formation of a multi-color image.

In accordance with the present invention, the brilliant points are displayed on the image projected onto the screen so that the image of the area corresponding to the brilliant points is recorded. Accordingly, the area designation does not need the reading of the coordinate by the scale and the position designation by the cursor, and the area designation is very easy to conduct. Further, since the area designation is done on the image, exact designation is attained.

Figure 9:
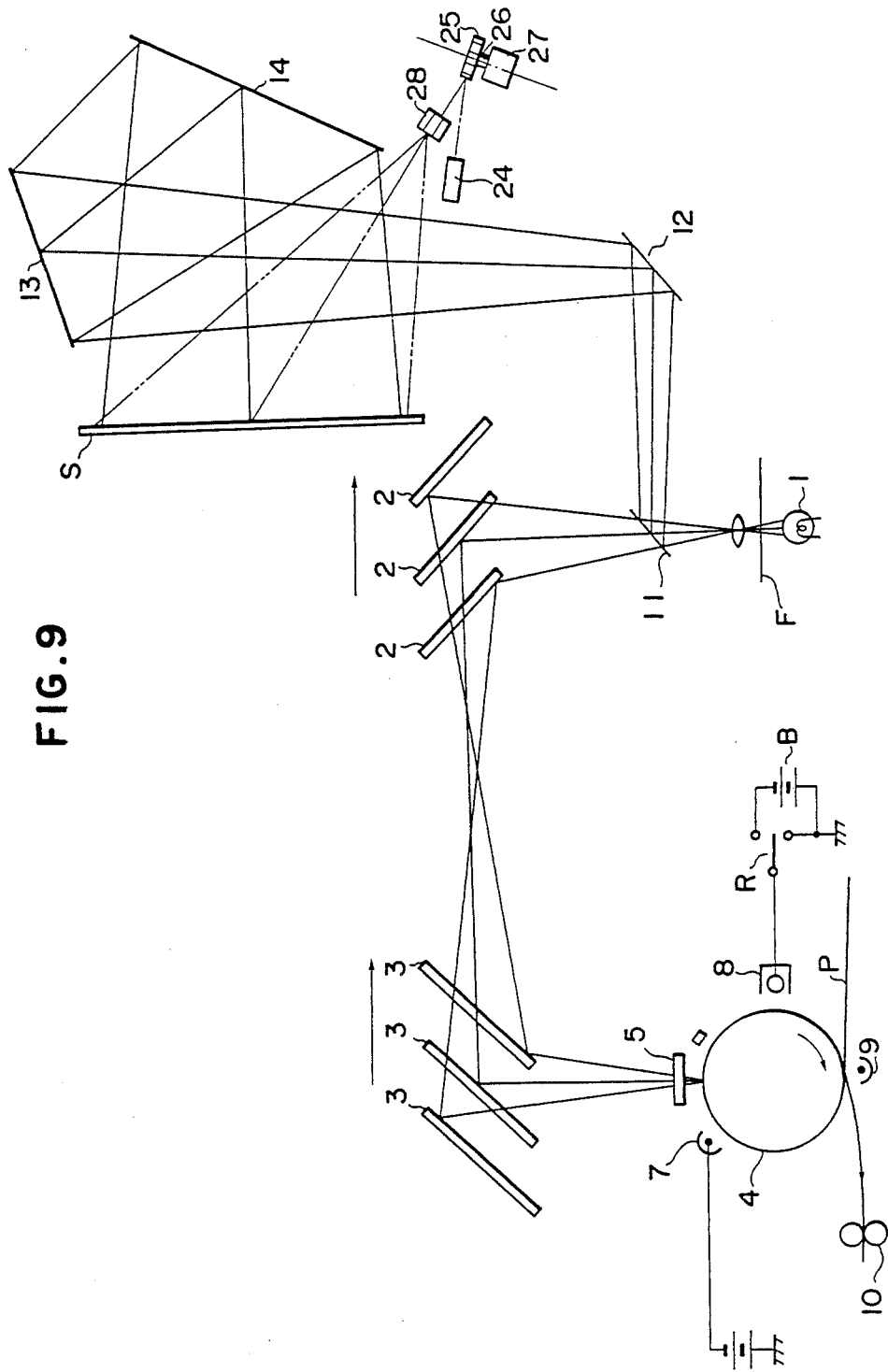
FIG. 9 shows a schematic configuration of another embodiment of the reader/printer.

FIG. 9 shows another embodiment of the present invention, in which the like numerals to those of the previous embodiment are designated by the like numerals.

In FIG. 9, numeral 24 denotes a laser beam generator used as a display means for projecting and displaying a designated area onto the screen S, numeral, 25 denotes a polygon mirror for scanning a laser beam in an X direction on the screen S, numeral 26 denotes a rotation shaft having an air bearing therein for holding the polygon mirror 25, numeral 27 denotes a motor for rotating the polygon mirror 25 at a constant speed, and numeral 28 dentoes an acoustic-optical effect element for scanning the laser beam in a Y direction on the screen S.

Figure 10:
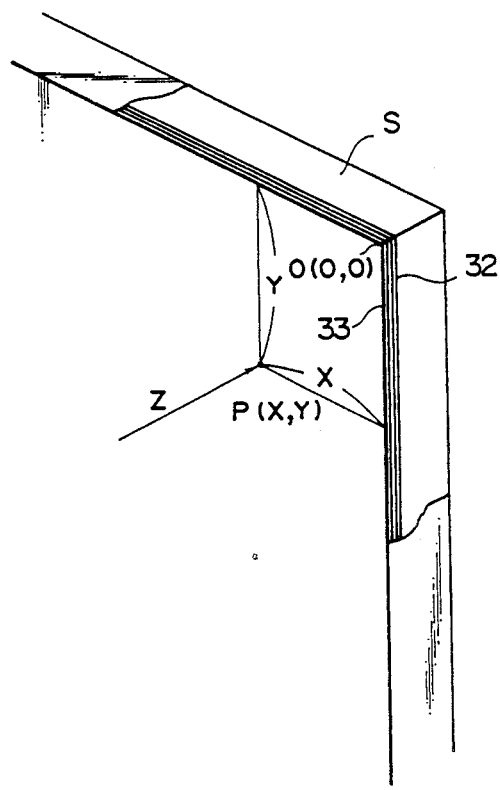
FIG. 10 shows a perspective view of a major portion of a screen in the embodiment of FIG. 9.
Figure 11:
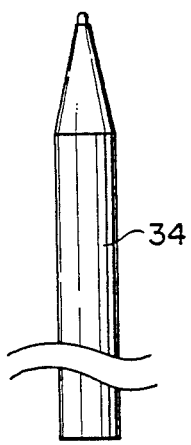
FIG. 11 shows a front view of a touch pen in the embodiment.

FIGS. 10 and 11 show an embodiment of input means for designating an area of the image projected on the screen. Reference character S denotes a transmission type screen, and numerals 32 and 33 denote a pair of transparent electrodes. By pressing any point P(X, Y) in a direction Z (FIG. 10) by a touch pen 34 of FIG. 11 as the input means, the position of P(X, Y) relative to a reference point $\bar{0}$ (0, 0) can be detected.

Figure 12:
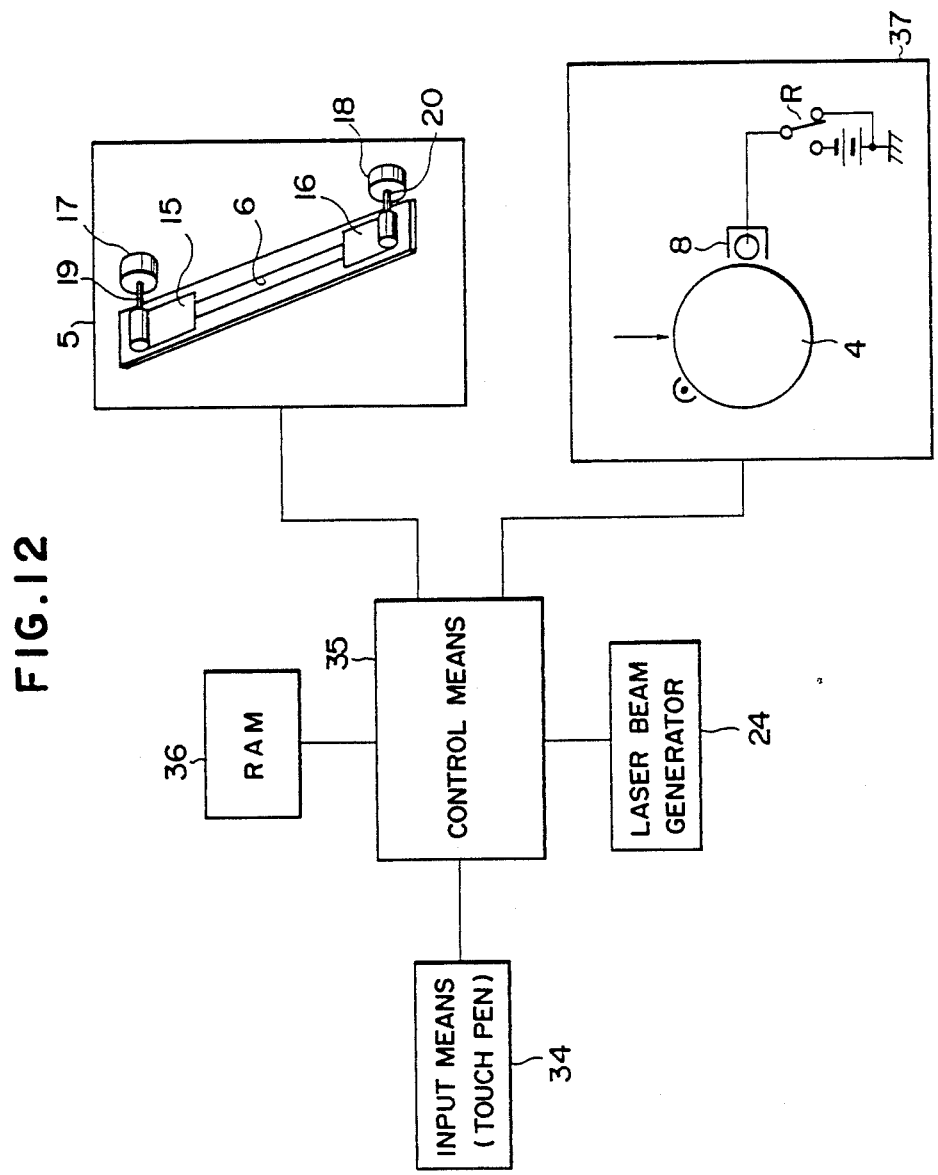
FIG. 12 shows a block diagram of a control system in the embodiment.

FIG. 12 shows a block diagram of a control system in the present embodiment. Numeral 24 denotes a laser beam generator used as the display means, numeral 34 denotes a touch pen used as the input means, numeral 35 denotes control means comprising a microcomputer or the like, numeral 36 denotes a RAM for storing a coordinate position designated by the touch pen 34, numeral 5 denotes a shutter base for controlling an image formation area in an axial direction of the photosensitive drum, and numeral 37 denotes a development bias application circuit for controlling the image formation area in a circumferential direction of the photosensitive drum.

Figure 13:
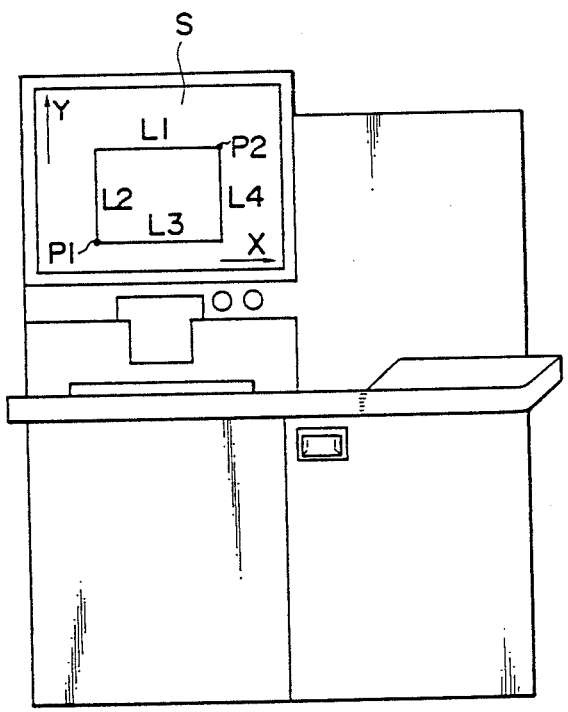
FIG. 13 shows an outer front view of the reader/printer.

In the present embodiment, the image is processed in the following manner. As shown in FIG. 13, two diagonal coordinate positions P1 and P2 of the image area to be recorded are designated on the screen S by the touch pen 34 and the coordinate positions are entered. Then, the laser beam generator 24, polygon mirror 25 and acoustic-optical effect element 28 are activated so that a rectangular frame having a diagonal defined by the designated coordinate positions P1 and P2 and brilliant lines L1, L2, L3 and L4 as shown in FIG. 13 is displayed on the screen S by the laser beam emitted by the laser beam generator 24. This rectangular frame is the area designated by the operator. The associated data are stored in the RAM 36.

The control means 35 then carries out the following image forming operation in accordance with the coordinate data stored in the RAM 36. For the direction orthogonal to the axial direction of the photosensitive drum 4, the relay R is activated or deactivated to turn on and off the development bias B applied to the developing unit 8 to control the toner development. For the axial direction of the photoconductor drum 4, the pulse motors 17 and 18 shown in FIG. 2 are driven to wind and rewind the shutter plate 15 and 16 to control the longitudinal aperture length of the slit 6. The scanning mirrors 2 and 3 are scanned and the relay R is appropriately activated and deactivated to record the image on the transfer material P. As a result, the image of the image frame on the microfilm F is not recorded over the entire area of the image frame but only the image area corresponding to the designated coordinate positions P1 and P2 is recorded on the transfer material P.

In this manner, the printing (trimming) of the designated area, the erasure (masking) of the designated area and coloring of the designated area can be effected in accordance with the designated area.

Figure 14A:
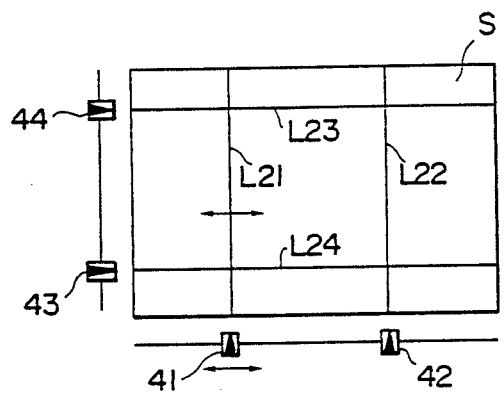
Figure 14B:
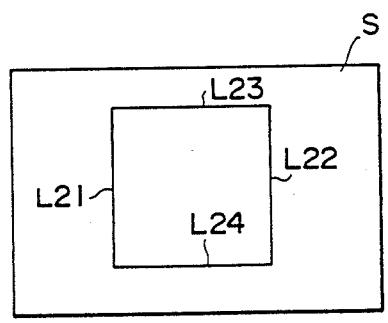

FIGS. 14(a) and 14(b) show a third embodiment of the image recording apparatus of the present invention. In the present embodiment, the conventional cursor is used instead of the transparent electrodes 32 and 33 and the touch pen 35 as the input means. Cursors 41 and 42 are provided along the X direction (horizontal direction) of the screen S and cursors 43 and 44 are provided along the Y direction (vertical direction), and the brilliant lines L21–L24 by the laser beam are moved with the movement of the cursors to display the designated area frame. In this manner, the conventional screen S may be used and the cost reduction is attained. The other configuration and operation are the same as those of the first embodiment and the explanation thereof is omitted.

Figure 15A:
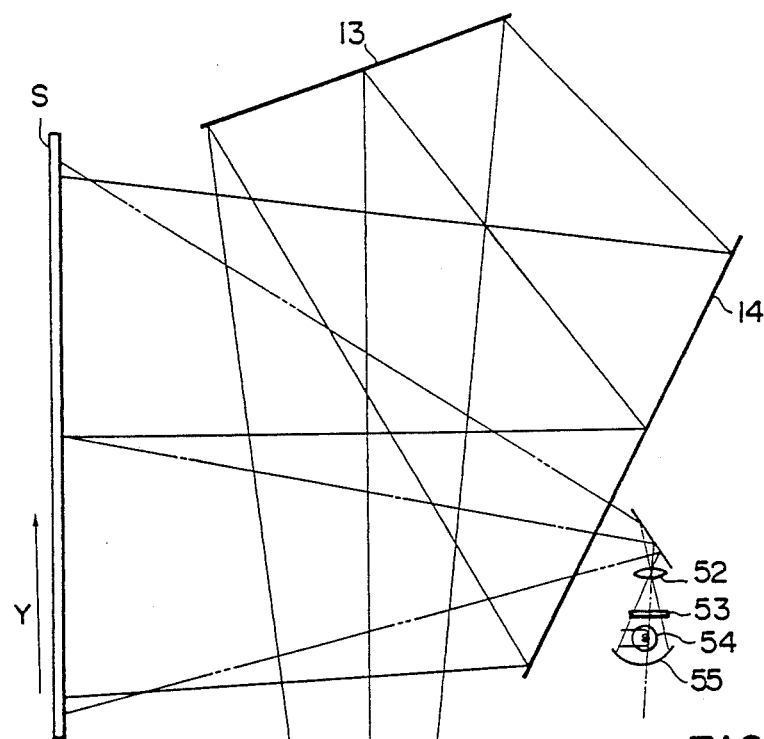
Figure 15B:
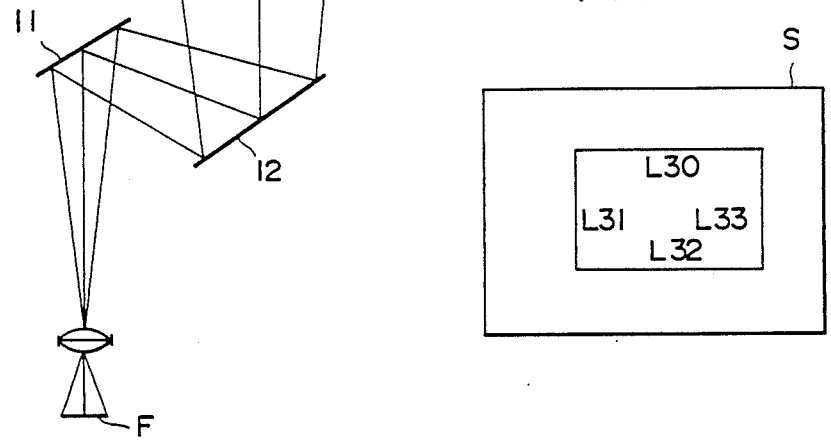

FIGS. 15(a) and 15(b) show a fourth embodiment of the image recording apparatus of the present invention. In the present embodiment, the display means which is feedback means of the designated area to the operator comprises a liquid crystal panel 53, a lens 52, a light source 54 and a reflection mirror 55, and brilliant lines L30–L33 formed on the liquid crystal panel as an index are enlarged and projected onto the screen S. Numeral 14 denotes a half-mirror. By controlling a voltage applied to transparent electrodes of the liquid crystal panel 53, as shown in FIG. 15(b), the designation frame defined by the brilliant lines L30–L33 can be displayed. Thus, mechanical operation of rotating the polygon mirror by the motor required in the first embodiment is not required and noise, vibration and power consumption are reduced. The image from the microfilm is not dark compared to the case where the liquid crystal screen is used. The other configuration and operation are the same as those of the first embodiment and the explanation thereof is omitted.

Figure 16A:
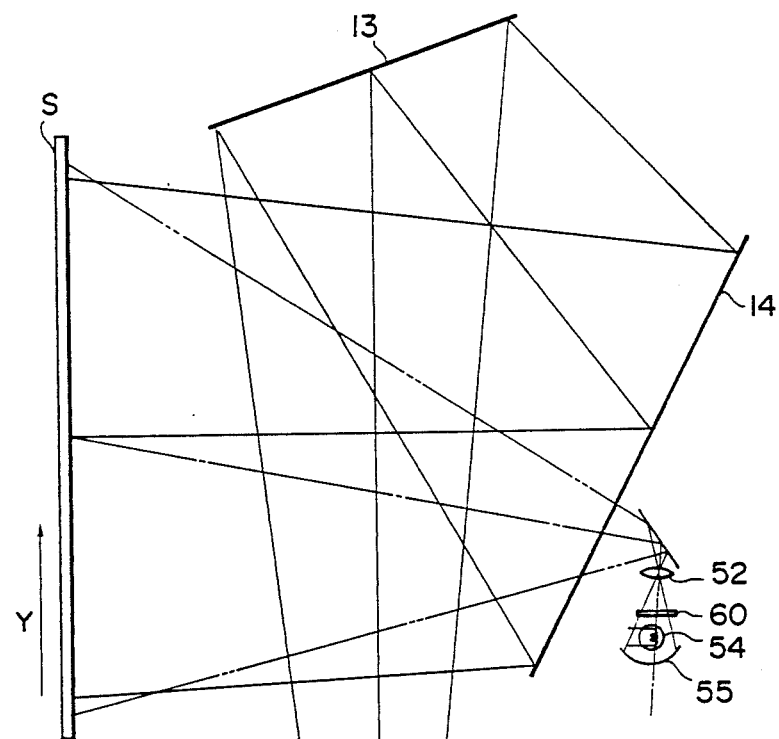
Figure 16B:
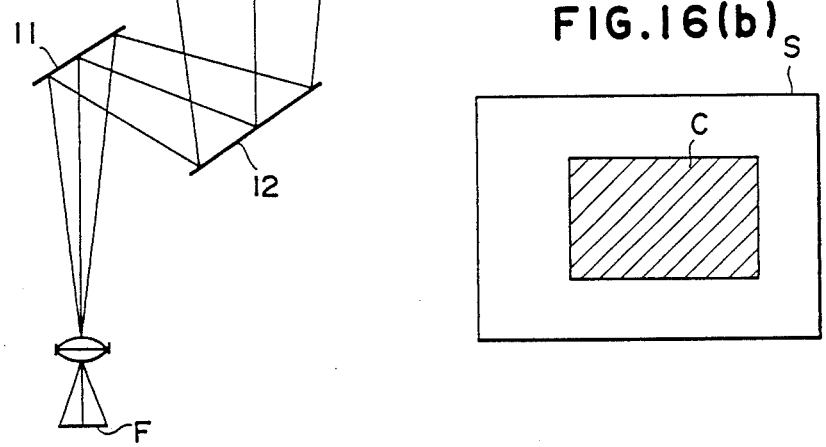

FIGS. 16(a) and 16(b) show a fifth embodiment of the image recording apparatus of the present invention. The like elements,.to those of the fourth embodiment of FIG. 15(a) and 15(b) are designated by the like numerals. In the present embodiment, a color liquid crystal panel 60 is used instead of the liquid crystal panel 53 so that a designated area C of the image on the screen S is colored in the same manner as the print color as shown in FIG. 16(b). In a reader printer of two or more colors, a plurality of designated area and colors thereof may be simultaneously displayed and miscoloring in the multi color is prevented. The other configuration and operation are the same as those of the fourth embodiment and the explanation thereof is omitted.

Figure 17:
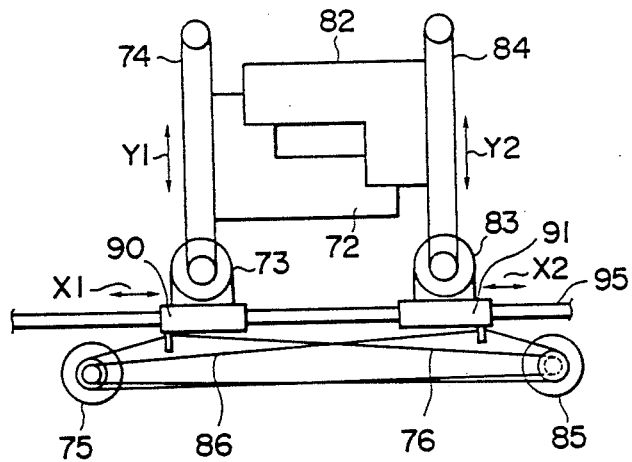
Figure 18:
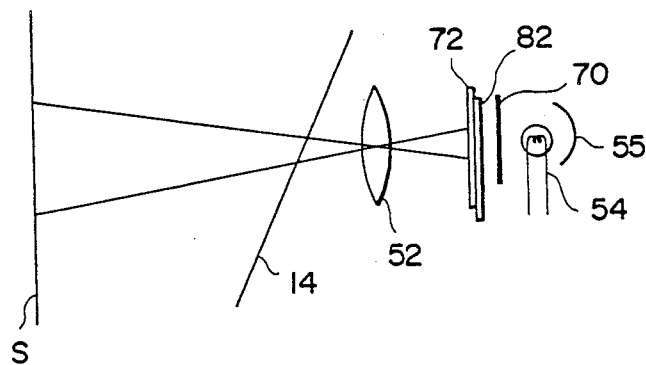

FIGS. 17 and 18 show a sixth embodiment of the image recording apparatus of the present invention. The like elements to those of the fourth embodiment of FIG. 15(a) and 15(b) are designated by the like numerals. In the present embodiment, a shade member which is vertically and horizontally movable is used as the display means instead of the liquid crystal panel. As shown in FIG. 18, a designated area is displayed on the screen S by an optical system comprising a lens 52, a color filter 70, a light source 54 and a reflection mirror 55. In FIG. 17, a shade member 72 is driven in a Y1 direction (vertical direction) by a motor 73 through a belt 74, and a movable member 90 is moved relative to a rail 95 by a motor 75 through a belt 76 so that the shade member is moved in an X1 direction (horizontal direction). Similarly, a shade member 82 is moved in a Y2 direction (vertical direction) by a motor 83 through a belt 84 and a movable member 91 is moved relative to the rail 95 by a motor 85 through a belt 86 so that the shade member 82 is moved in an X2 direction (horizontal direction). By the vertical and horizontal movements of the pair of shade members 72 and 82, the designated area is projected and displayed on the screen S. By providing a color filter 70 in the optical system, the image may be colored. Where a plurality of color developing units may be selectively used, they may be switched appropriately. The other configuration and operation are the same as those of the fourth embodiment and the explanation thereof is omitted.

In accordance with the imge recording apparatus of the present invention, where only a portion of the image projected onto the screen is to be recorded, erased or color-printed, the area designation may be done on the imge projected onto the screen. Since it is displayed on the screen in superposition to the image of the designated area, the operability is improved and even an unexperienced operator can easily operate the apparatus. The screen is not dark as it is in the conventional liquid crystal screen, no complex mechanism is required, the cost is reduced and the productivity is enhanced.

Figure 20:
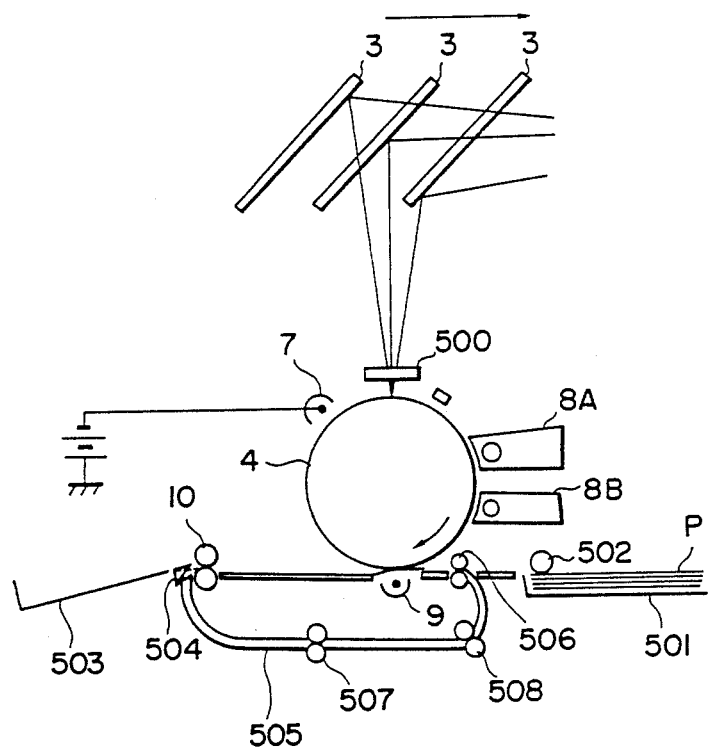
FIG. 20 shows another embodiment of a record unit.
Figure 21A:
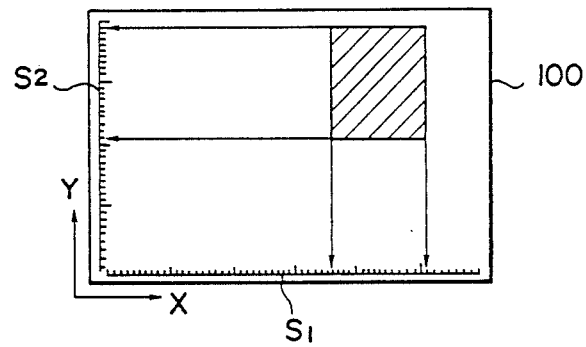
FIGS. 21(a), 21(b) and 21(c) show scale of screen, designated area and keyboard of a prior art apparatus which designates an area by reading coordinates.
Figure 21B:
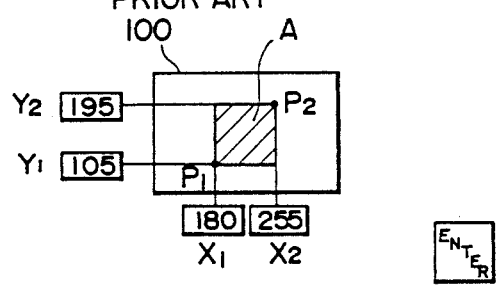
Figure 21C:
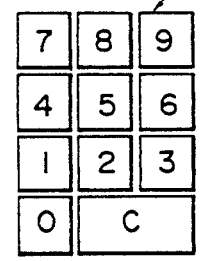
Figure 22:
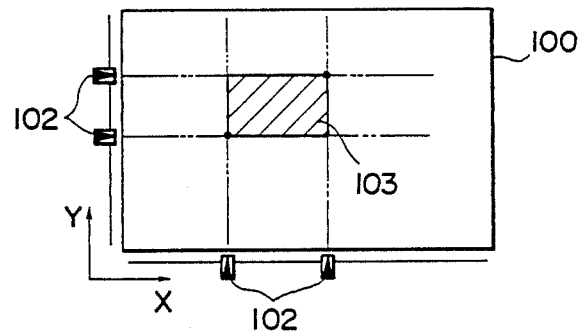
FIG. 22 shows another prior art apparatus which designates an area by a cursor.

FIG. 20 shows another embodiment of the recording appparatus, in which an image in an area designated by an index and an image outside the designated area are recorded on a transfer sheet with different colors. In FIG. 20, numeral 500 denotes a liquid crystal shutter for blocking and transmitting light of a selected area of the projected image, numeral 8A denotes a first developing unit having black toner, numeral 8B denotes a second developing unit having red toner, numeral 501 denotes a paper cassette, numeral 502 denotes a paper feed roller, numeral 503 dentoes a paper ejection tray, numeral 504 denotes a flapper for switching a feed direction of the transfer sheet, numeral 505 denotes a refeed path, and numerals 506, 507 and 508 denote paper feed rollers. The first and second developing units 8A and 8B are movable between development positions and non-development positions. When they are at the development positions, they develop the image. The flapper 504 is movable between a solid line position and a broken line position. When it is at the broken line position, it guides the transfer sheet P fed from the fixing unit 10 to the ejection tray 503, and when it is at the solid line position, it guides the transfer sheet P to the refeed path 505.

Assuming that the image in the area designated by the index, of the image projected on the screen is to be recorded in black and the image outside the designated area is to be recorded in red, the portion of the liquid crystal shutter 500 corresponding to the inside of the designated area is rendered transparent and the other portion is rendered opaque in accordance with the coordinate data of the index so that only the image in the designated area is exposed to the photoconductor drum 4. The exposed area is developed by the first developing unit 8A and the black developed image on the photo conductor drum is transferred to the transfer sheet P. The transfer sheet P is then fed to the fixing unit 10 and the guided to the refeed path 505 by the flapper 504. The portion of the liquid crystal shutter 500 corresponding to the outside of the designated area is then rendered transparent based on the coordinate data of the index and the other portion is rendered opaque so that only the image outside the designated area is exposed to the photoconductor drum 4, and the exposed area is developed by the second developing unit 8B. The red developed image on the photoconductor drum is transferred to the transfer sheet P fed from the refeed path 505. The transfer sheet P then passes through the fixing unit 10 and is guided to the eject tray 503 by the flapper 504. Accordingly, the image in the designated area is recorded in black and the image outside the designated area is recorded in red on the transfer sheet P. The colors of the respective image areas may be appropriately selected and only the designated area may be recorded in a specified color.

What is claimed is:

1. An image recording apparatus for recording an image of an image carrier on a recording medium, comprising:
   projection means for projecting the image of the image carrier onto a screen;
   display means for displaying a light spot at a desired position on the screen;
   pressure-responsive position inputting means disposed on the screen, the inputting means, when depressed, providing information corresponding to the location of the depressed position; and
   control means for controlling the display means in response to the information provided by the inputting means to display the light spot at a portion on the screen corresponding to the pressed position.

2. An image recording apparatus according to claim 1, wherein the display means includes means for generating the spot of light and optical means for directing the spot of light to the screen.

3. An image recording apparatus according to claim 1, wherein the position inputting means comprises a touch panel which is laminated on the screen and provides positional information corresponding to a pressed position.

4. An image recording apparatus according to claim 2, wherein the optical means comprises a mirror for reflecting the light spot, and the control means comprises drive means for rotating the mirror.

5. An image recording apparatus according to claim 1, further comprising means for setting a region of the image to be recorded on the recording medium on the basis of the positional information.

6. An image recording apparatus according to claim 5, further comprising means for setting a region of the image to be recorded on the recording medium in which a region color is to be changed, on the basis of the positional information.

7. A reader printer which projects an image recorded on a microfilm onto a screen, and by which a copy of the image is obtained, comprising:
   position input means attached to the screen in a laminated state, said input means generating an electric signal when a desired position of an image projected on the screen is depressed, and wherein the electrical signal corresponds to a coordinate of a depressed position;
   display means for displaying an index at a desired position on the screen;
   display control means for controlling the display means by the electric signal to display an index at a position on the screen corresponding to the position depressed by the input means; and
   copying region control means for controlling the copy of an image corresponding to the position designated on the screen, on the basis of the electric signal provided by said position input means.

8. A reader printer according to claim 7, wherein the input means includes a touch panel which provides an electric signal corresponding to a pressed position.

9. A reader printer according to claim 7, wherein said display means includes generation means for generating a spot of light and optical means for guiding the spot of light to the screen as an index.

* * * * *

UNITED STATES PATENT AND TRADEMARK OFFICE
CERTIFICATE OF CORRECTION

PATENT NO. : 4,958,186

DATED : September 18, 1990

INVENTOR(S) : Sashida

It is certified that error appears in the above-identified patent and that said Letters Patent is hereby corrected as shown below:

Title page:

AT [56]:

"56-110924 2/1981 Japan." should read --56-110924 9/1981 Japan.--.

COLUMN 1:

Line 13, "an which on" should read --on which an--.

Line 53, "iamge" should read --image--.

COLUMN 2:

Line 54, "area image" should read --image area--.

COLUMN 6:

Line 14, "like numerals" should read --like elements--.

Line 19, "numeral, 25" should read --numeral 25--.

Line 25, "dentoes" should read --denotes--.

COLUMN 7:

Line 3, "plate" should read --plates--.

UNITED STATES PATENT AND TRADEMARK OFFICE
CERTIFICATE OF CORRECTION

PATENT NO. : 4,958,186

DATED : September 18, 1990

INVENTOR(S) : Sashida

Page 2 of 2

It is certified that error appears in the above-identified patent and that said Letters Patent is hereby corrected as shown below:

COLUMN 8:

Line 26, "imge" should read --image--.

Line 30, "imge" should read --image--.

Line 48, "dentoes" should read --denotes--.

COLUMN 9:

Line 7, "the guided" should read --then guided--.

COLUMN 10:

Line 26, "electrical signal" should read --electric signal--.

Signed and Sealed this

Twelfth Day of January, 1993

*Attest:*

DOUGLAS B. COMER

*Attesting Officer*     Acting Commissioner of Patents and Trademarks